(12) United States Patent
Gerber et al.

(10) Patent No.: US 7,702,544 B2
(45) Date of Patent: Apr. 20, 2010

(54) METHOD FOR ASSISTING SELECTION OF A BUILD AHEAD CONFIGURATION FOR USE IN SUPPLYING AN ORDERED PRODUCT

(75) Inventors: Timothy James Gerber, Rochester, MN (US); Ivory Wellman Knipfer, Rochester, MN (US); Thomas S. Mazzeo, Durham, NC (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 11/748,954

(22) Filed: May 15, 2007

(65) Prior Publication Data

US 2008/0288373 A1   Nov. 20, 2008

(51) Int. Cl.
G06Q 30/00 (2006.01)
G06F 17/30 (2006.01)
G06Q 10/00 (2006.01)
(52) U.S. Cl. .............................. 705/26; 705/27; 705/28
(58) Field of Classification Search .................. 705/28, 705/29
See application file for complete search history.

(56) References Cited

U.S. PATENT DOCUMENTS

| | | | |
|---|---|---|---|
| 6,003,012 A | 12/1999 | Nick | |
| 6,009,406 A | 12/1999 | Nick | |
| 6,343,285 B1 * | 1/2002 | Tanaka et al. | 705/400 |
| 6,449,587 B1 * | 9/2002 | Jungst | 703/1 |
| 6,490,493 B1 * | 12/2002 | Dharnipragada | 700/97 |
| 6,493,679 B1 * | 12/2002 | Rappaport et al. | 705/29 |
| 6,745,172 B1 | 6/2004 | Mancisidor et al. | |
| 7,006,988 B2 * | 2/2006 | Lin et al. | 705/26 |
| 7,031,968 B2 * | 4/2006 | Kremer et al. | 707/100 |
| 7,065,499 B1 * | 6/2006 | Seth et al. | 705/26 |
| 7,092,966 B2 * | 8/2006 | McIntyre | 707/104.1 |
| 7,415,010 B1 * | 8/2008 | Croak et al. | 370/352 |
| 2002/0188622 A1 | 12/2002 | Wallen et al. | |
| 2006/0015589 A1 | 1/2006 | Ang et al. | |

* cited by examiner

*Primary Examiner*—F. Zeender
*Assistant Examiner*—Hajime Rojas
(74) *Attorney, Agent, or Firm*—Yee & Associates, P.C.; Steven L. Bennett

(57) ABSTRACT

A method is provided for use in connection with build ahead configurations (BAC's), for enabling a manufacturer to quickly identify the available BAC that is most suitable for use in completing a product order. In one embodiment, directed to a method for increasing efficiency in constructing individual products of a particular product type, each individual product has an associated specification set. A number of BAC's are initially constructed, wherein each BAC comprises an at least partially complete product of the particular type, and likewise has an associated specification set. An order is received for an individual product of the particular type, wherein the order defines each specification in the specification set for the ordered product. Respective specifications for the ordered product are compared with the specifications of each BAC, in order to calculate a metric for each BAC, wherein the metric for a given BAC represents the effort required to modify the given BAC to conform to all specifications set of the ordered product.

20 Claims, 7 Drawing Sheets

METHOD FOR ASSISTING SELECTION OF A BUILD AHEAD CONFIGURATION FOR USE IN SUPPLYING AN ORDERED PRODUCT

BACKGROUND OF THE INVENTION

1. Field of the Invention

The invention disclosed and claimed herein generally pertains to a method for increasing efficiency in selecting a build ahead configuration (BAC), pertaining to a particular type of product, for use in supplying an ordered product of the particular type. More specifically, the invention pertains to a method for readily determining the amount of effort required to modify or reconfigure each of a number of BAC's, in order to meet the specifications of a newly ordered product. Even more particularly, the invention pertains to a method of the above type wherein the BAC's are ranked or placed in an order, according to the modification effort they respectively require.

2. Description of the Related Art

In industries such as the computer and electronics industries, wherein manufacturers supply complex products, customers typically want the products they order to be highly configurable. That is, for a particular type or category of product, customers want a large number of options to choose from, in regard to product properties, characteristics, features and/or components. As a result, orders for different individual products of the same product type can have specifications that are quite different from one another. This situation is illustrated, for example, by certain types of computer related products. Such products can have numerous options in regard to characteristics and components, such as the amount of memory, the type of storage, the type of monitor and the type of CD-ROM.

It will be readily apparent that complex products as described above generally cannot be built in advance, that is, before customer orders are received therefor. It is too difficult to predict exactly what the specifications for different product orders will require. As a result, an effort to build and store such products in advance would require a very large inventory, in order to cover all reasonable permutations of orderable features, and such inventories tend to be very expensive. At the same time, suppliers can face substantial pressure to reduce the time needed to deliver products of the above types, upon receiving customer orders for them. For example, business requirements could mandate that a product must be built and shipped by the end of the current calendar quarter. Alternatively, an ordered product could be needed by the customer sooner than normal scheduling would allow, due to limitations on manufacturing capacity or for other reasons.

To meet these conflicting needs and requirements, procedures have been developed whereby the producer and supplier will estimate, based on its experience and knowledge, the features, characteristics, and components that will be fairly close to what customers will actually want, when ordering the supplier's products of a particular product type. The supplier then builds or constructs a number of configurations based on the estimates, wherein each configuration is a partially completed or unfinished version of a product of the particular type. These configurations are referred to as build ahead configurations (BAC's). Moreover, different BAC's of the same product type are usefully built to have characteristics or components that are different from one another, in order to cover a range of characteristics and components. Then, when an order for an individual product of the particular product type is received, the supplier will decide which of the available BAC's most closely matches the specifications of the received order. This BAC is then selected, and reconfigured as needed to comply with the order. BAC's are sometimes referred to as common configurations, or as "plain vanilla" versions or machines.

The procedures disclosed above have generally proved to be very beneficial. However, selecting the best BAC to use for a product order, from a group of pre-constructed BAC's of the particular product type, generally requires comparing the respective characteristics of each BAC with the product order specifications. Currently, a significant amount of time consuming effort can be required to perform this task. Accordingly, it would be advantageous to provide an automated mechanism for efficiently determining which of a number of available BAC's could be modified, with the least amount of effort, to match the product order specifications. Also, it would be beneficial to prioritize or rank the available BAC's, according to the respective modification effort required for each one. This would be useful in advising a product manufacturer of the best BAC to select, for use in completing a product order.

BRIEF SUMMARY OF THE INVENTION

The invention is generally directed to a method for use in connection with build ahead configurations (BAC's), for enabling a manufacturer to quickly identify the available BAC that is most suitable for use in completing a product order. Embodiments of the invention can also provide a list of available BAC's, in which the utility of each BAC is ranked or prioritized. Embodiments can be used to maximize manufacturing capacity, optimize inventory within a build ahead model, and assist in meeting customer requirements for short cycle time shipments. One embodiment is directed to a method for increasing efficiency in constructing individual products of a particular product type, wherein each individual product has an associated specification set. The method comprises initially constructing a number of BAC's, wherein each BAC comprises an at least partially complete product of the particular type and has an associated specification set. An order is received for an individual product of the particular type, wherein the order defines each specification in the specification set for the ordered product. The method further comprises comparing respective specifications of the ordered product with the respective specifications in the specification set of each BAC, in order to calculate a metric for each BAC. The metric for a given BAC represents the effort required to modify the given BAC to conform to all specifications in the specification set of the ordered product.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
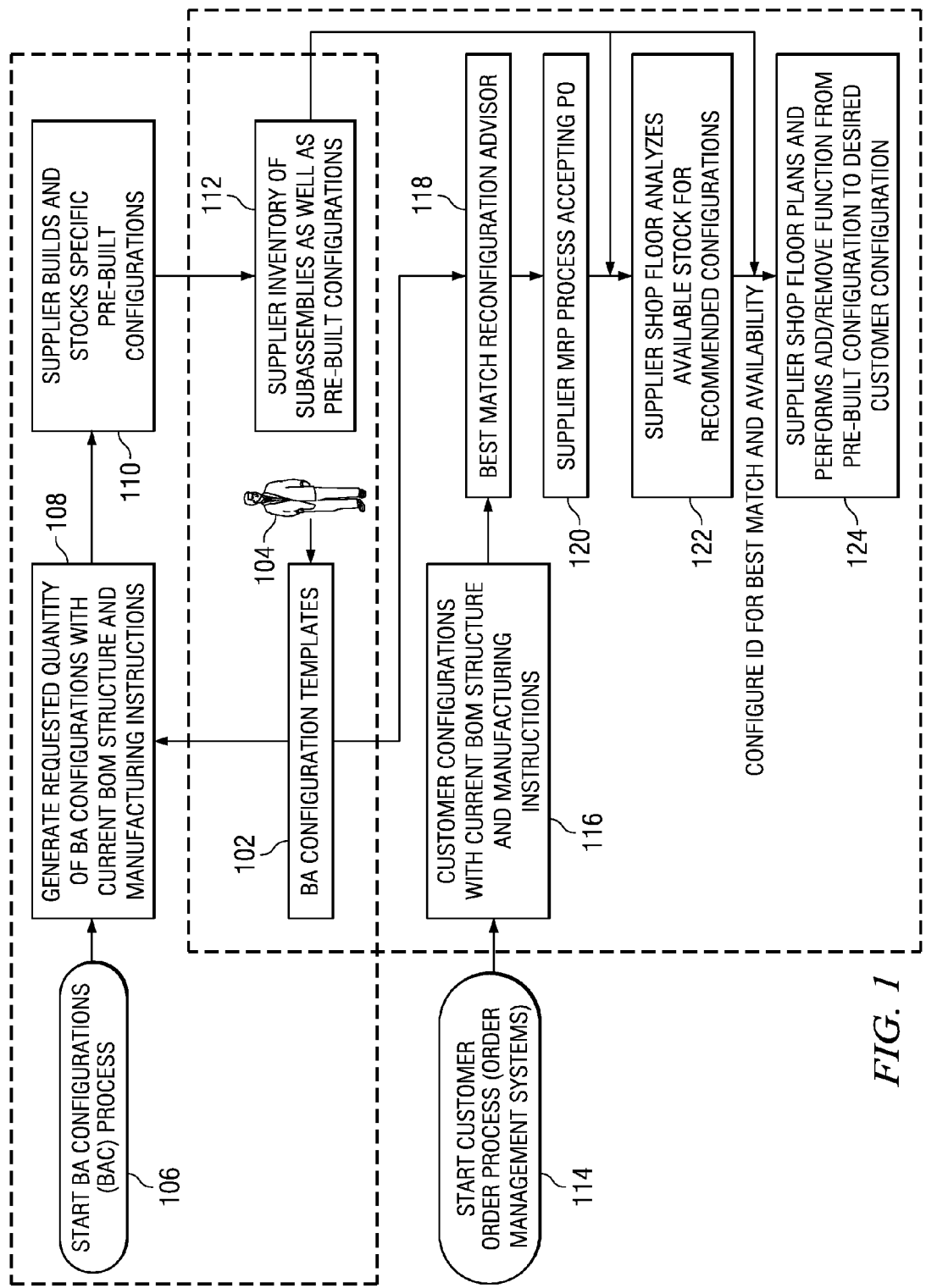
FIG. 1 is a flow chart illustrating an overall process or environment in which embodiments of the invention are implemented.

Referring to FIG. 1, there is shown an overall process that implements an embodiment of the invention, wherein the process is carried out by a source provider of configurable products of a particular type. At function block 102, templates are created and stored for a number of build ahead configurations (BACs) that pertain to the particular product type. The templates may be generated on the basis of estimates furnished by a Build Ahead manager or user 104, in regard to anticipated demand for the configurable products of the particular type. Generation of BAC templates would also be guided by and in accordance with the then current products being offered for sale by the source provider.

Each template contains a particular set of specifications for use in building one or more identical BACs. The specification set includes a bill of materials (BOM) structure and manufacturing instructions, wherein the BOM structure comprises a list of all parts and other components for the BAC, as well as the quantities and locations of respective parts. Usefully, other templates with different specifications for the same product type would also be provided, in order to make different BAC families available. For example, if the product type was a computer related product, different versions or families could have different kinds of processors. Accordingly, different templates for the product type would show the same basic product configuration, but with the different processors.

At function block 106, the BAC process is started. In response, a request is generated at function block 108 to provide a quantity of BAC's in accordance with the templates created at function block 102. At function block 110 the requested BACs are built by a supplier, and are stocked in inventory by identification or stock number, as pre-built configurations. The supplier is usefully an independent vendor to the source provider, but the invention is not limited to such arrangement. Function block 112 indicates that BAC inventories can include subassemblies, and can also include pre-built configurations that are nearly completed products.

Referring further to FIG. 1, a customer order process is shown to start at function block 114. Thereupon, a customer order with detailed specifications for a product of the particular type is received by the product source provider. As shown by function block 116, the customer product order specifies a configuration of BOM structure and manufacturing instructions. FIG. 1 further shows that the received customer order is sent to a best match reconfiguration advisor, at function block 118.

The best match advisor is operated in accordance with embodiments of the invention, as described hereinafter in further detail in connection with FIGS. 2A and 2B and 3A and 3B. FIG. 1 shows that in addition to receiving the customer order, the best match advisor also receives the respective BAC templates created and stored at function block 102. As described above, BACs for each of these templates were previously constructed, and have become available in the supplier inventory. Generally, the best match advisor compares the specifications of the customer product order with each of the BAC templates. The advisor then identifies the BACs that are found to match or meet the order specifications to within a prespecified threshold. The advisor also ranks such identified BACs, according to the amount of effort required to modify respective BAC's to comply with the ordered product order configuration. The BAC requiring the least effort to meet such configuration, by adding or removing parts and/or functions would be ranked highest. The BAC requiring the greatest amount of effort would be ranked lowest.

When the best match advisor completes its rankings, a purchase order (PO) is generated for the supplier, who is responsible for completing the ordered product. A list containing the ranking of BACs is sent to the supplier with the purchase order as shown at function block 120. This function pertains to the supplier's material resource planning (MRP) process. The list of rankings will provide the supplier with useful guidance or recommendations for carrying out the order. At function block 122 the supplier performs an analysis, to determine which of the ranked BACs are currently available in the supplier's inventory. If the highest ranked BAC is still available, that BAC would then be selected and reconfigured to meet the product configuration. However, if the first ranked BACs was not available, because of prior commitment for use or other reasons, the supplier could immediately select the second ranked BAC, if still available. At function block 124, after determining which of the available BACs is the best match for the ordered product, the necessary modifications to the selected BAC, as required to conform it to the ordered configuration, are planned and carried out.

It will be seen that the procedure depicted by FIG. 1 provides very useful assistance to the supplier and at the same time provides the supplier with a great deal of flexibility in managing the manufacturing process.

Figure 2A:
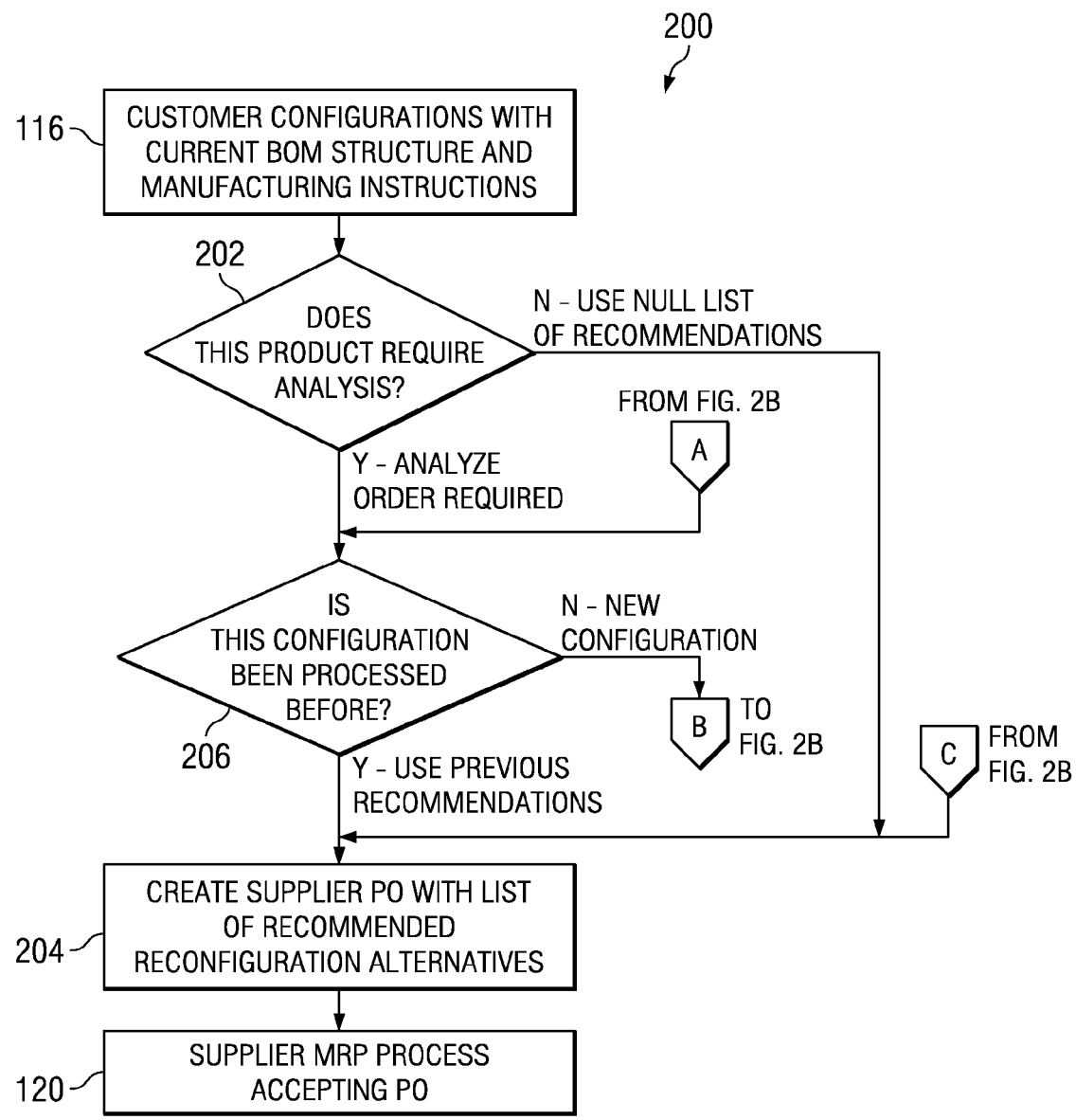
FIGS. 2A and 2B show a flow chart illustrating operation of an embodiment of the invention.
Figure 2B:
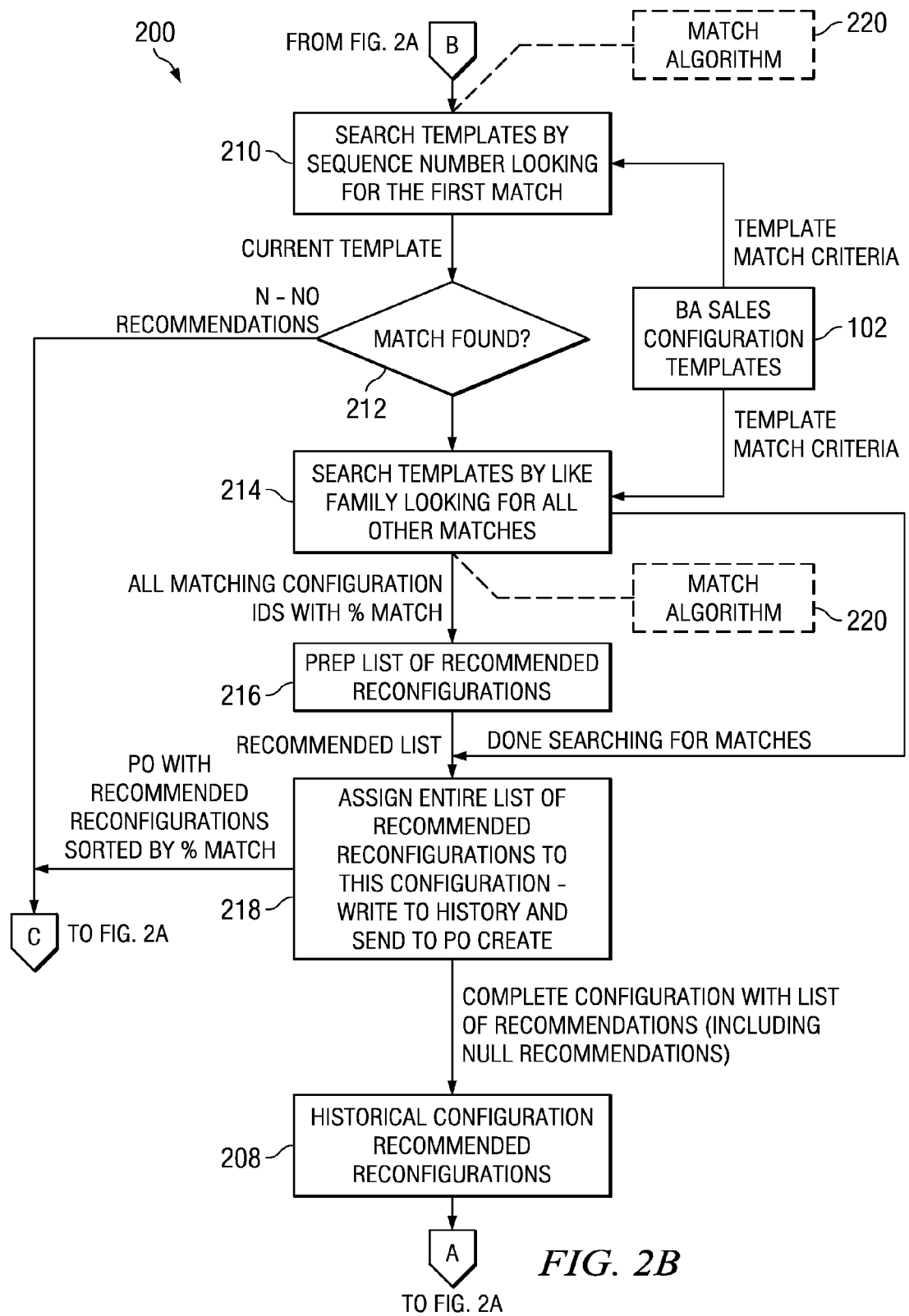

Referring to FIGS. 2A and 2B, there is shown a flow chart illustrating operation of a best match reconfiguration advisor 200. Upon sending the customer order for a product to the best match advisor, as described above in connection with steps 116 and 118 of FIG. 1, decision block 202 decides whether or not the ordered product requires analysis. For example, BACs may not be built for some types of products which have very low sales volumes, and are seldom ordered by customers. Other types of products may be so complex, or could have so many variations, that it is not practical to prepare build ahead configurations for them. For these types of products, decision block 202 generates a negative output, and the advisor 200 provides no recommendation in regard to use of BACs in filling the customer order. In response to the negative output, function block 204 creates a supplier PO, which indicates that the ordered product should be built completely "from scratch". That is, the product should be built without use of any previously constructed configurations or subassemblies. The supplier receives the PO for its MRP process at function block 120, as described above.

Figure 4:
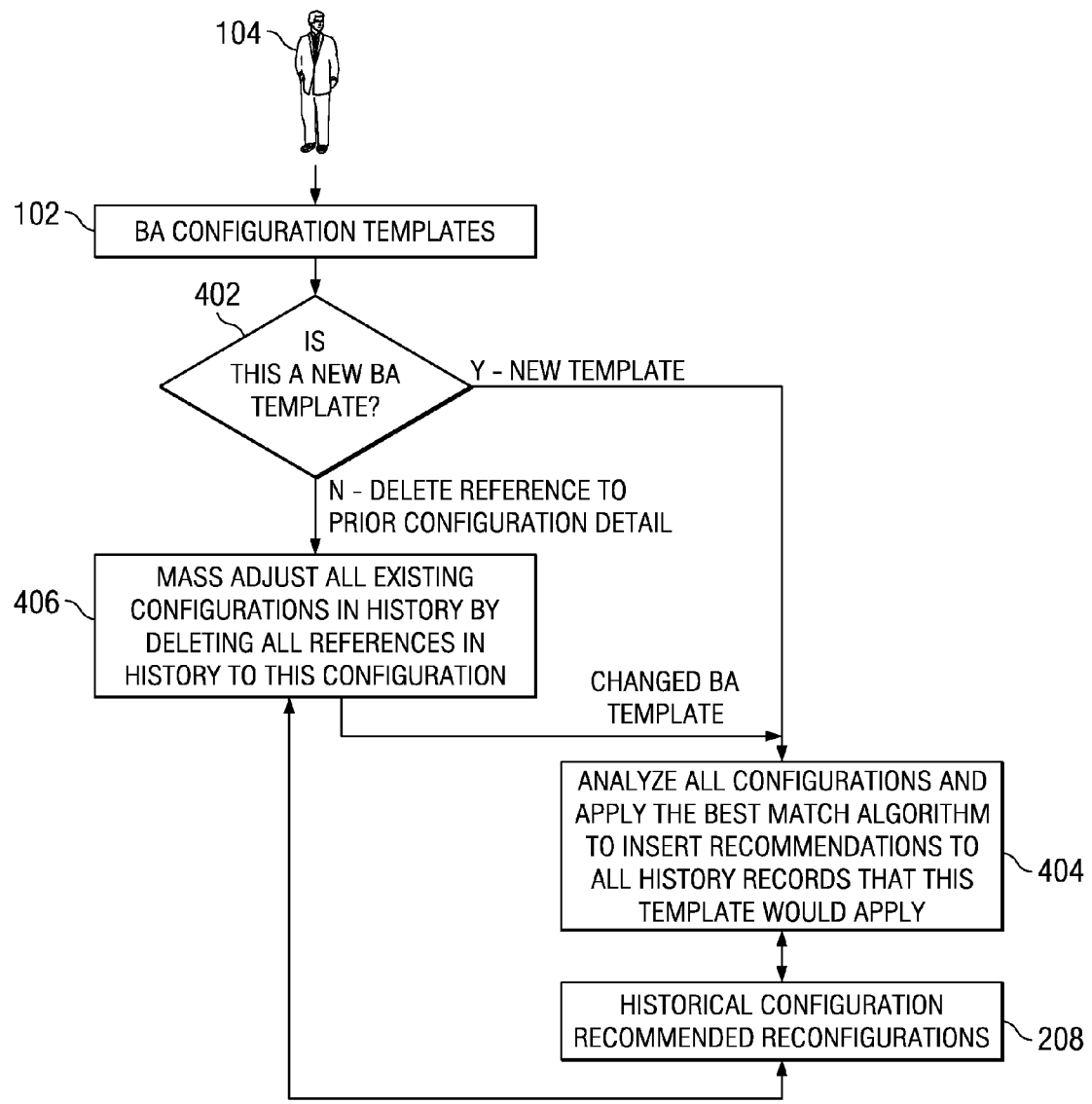
FIG. 4 show a flow chart illustrating a procedure for adjusting configuration related data stored in a historical database.

If the output from decision block 202 is positive, indicating that BACs may be available for the customer order, advisor 200 proceeds to decision block 206. Decision block 206 then determines whether the configuration of the particular ordered product has been analyzed previously by advisor 200, for a product that was identical to the ordered product. If so, the BAC recommendations generated for the previous identified product are retrieved from a database associated with function block 208. These recommendations are sent to function block 204, for attachment to the supplier PO. Function block 208, referred to hereinafter in connection with FIG. 4, is involved in maintaining and updating a historical record in the database of previous BAC recommendations made by advisor 200.

If it is determined at decision block 206 that the ordered product configuration was not previously analyzed or processed, advisor 200 proceeds to function block 210. At this function, respective BAC templates that were created and stored in connection with function block 102, as described above, are sequentially retrieved from a database for comparison with the specifications of the ordered product. More particularly, templates are searched to determine whether at least one BAC can be found that sufficiently matches the configuration required by the ordered product. Thus, upon finding a first match, decision block 212 generates a positive output, and the operation of best match reconfiguration advisor 200 proceeds to function block 214. However, if no match is found between the ordered product and any of the BACs, operation of the advisor is routed to function block 204. Function block 204 then recommends building the ordered product from scratch.

At function block 214, all the templates are searched sequentially, by BAC family as defined above, to determine the extent to which the parts needed for the ordered product match the parts contained in respective BACs. The best match advisor 200 determines an overall percentage of matching for each BAC, wherein the BACs are respectively identified by identification number. As described hereinafter in connection with FIGS. 3A and 3B, BACs with a match percentage that exceeds a prespecified threshold value are routed to function block 216, which prepares a prioritized list of such BACs. Match percentage is considered to provide a very useful measure of the amount of effort needed to modify or reconfigure a particular BAC, in order to meet all requirements and specifications of the ordered product configuration. Accordingly, BACs are ranked on the list in order of their respective match percentages.

It is considered that the mechanism of best match advisor 200, which sorts BACs by the percentage of actual match with the order configuration, provides a very advantageous reconfiguration alternative. It is generally easier to add parts to configurations then to tear down or remove parts. As an alternative, the search could be based on a number of matching parts to maximize parts tested, which may drive significant removals.

FIG. 2 further shows that the BAC template searches, at both function blocks 210 and 214, are carried out by a match algorithm 220. Respective steps of the match algorithm are discussed hereinafter in further detail, in connection with FIGS. 3A and 3B.

Referring further to FIGS. 2A and 2B, there is shown the list prepared at function block 216 directed to function block 218, which routes the list to function block 204 for attachment to the supplier PO. Function block 218 also routes the list to function block 208, so that the list can be placed in the historical database associated with function block 208.

Figure 3A:
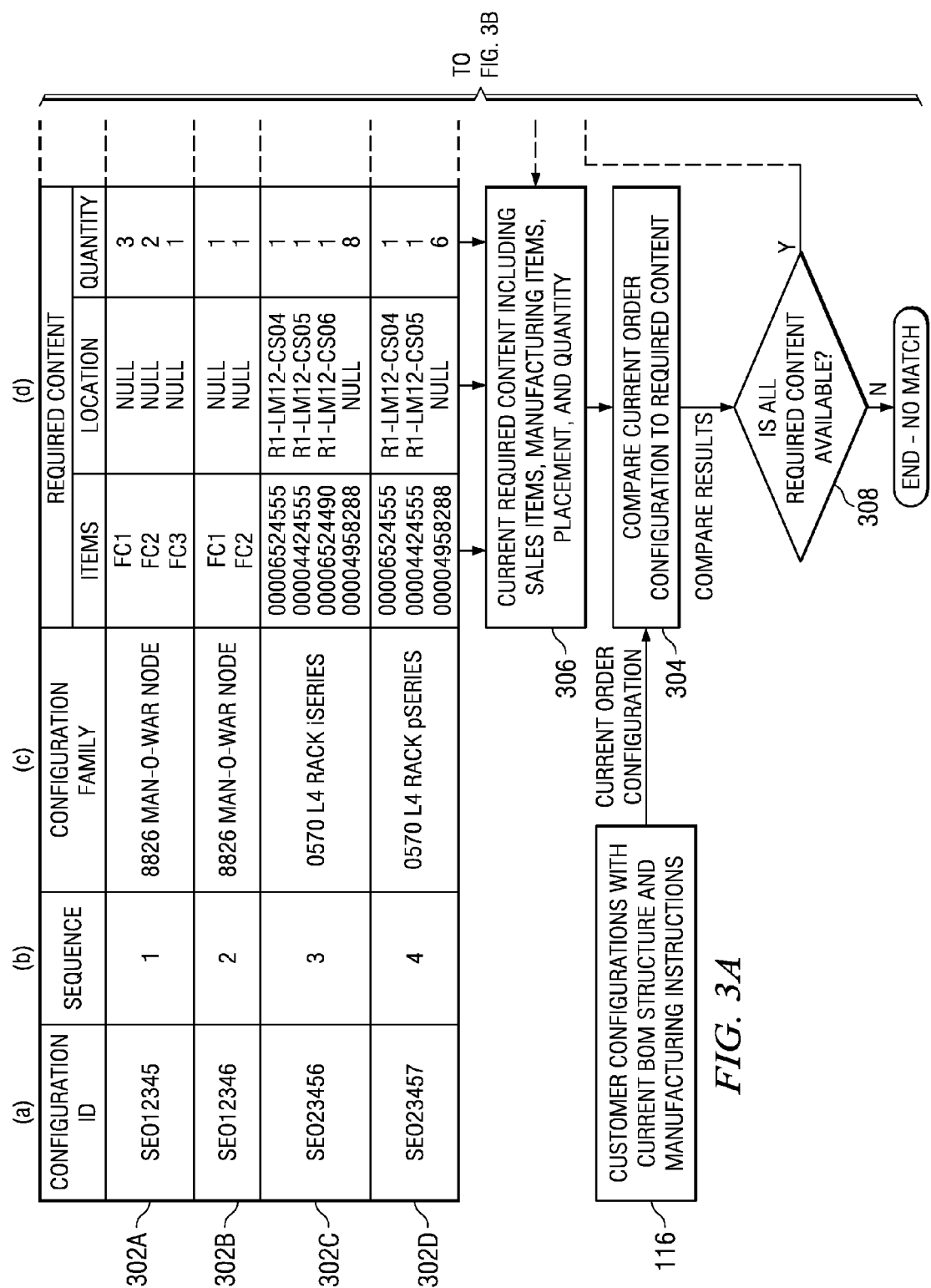
FIGS. 3A and 3B show a schematic diagram further illustrating the embodiment of FIG. 2.
Figure 3B:
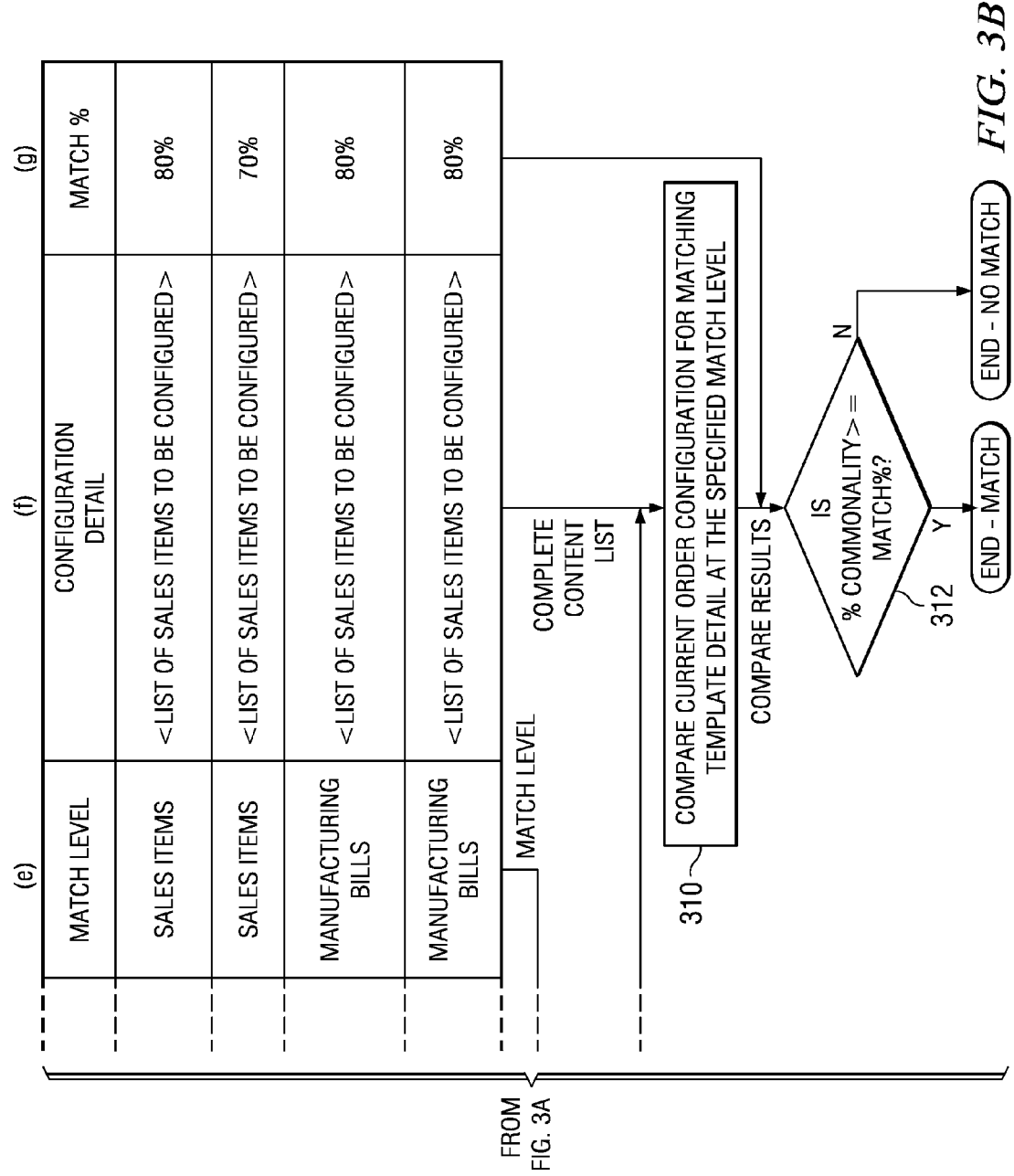

Referring to FIGS. 3A and 3B, there are shown by way of example templates 302A-D, which respectively pertain to four different BACs (not shown) that were previously constructed and inventoried by the supplier. Each template includes columns (a)-(g). Information contained in these templates, together with information in the customer product order, is used by the match algorithm to compute a match percentage for each of the BACs, as further shown in FIG. 3. In column (a), each template shows the inventory stock number of its corresponding BAC. Column (b) indicates the sequence in which the BACs 302A-D are successively searched or processed by the algorithm.

Column (c) indicates the configuration family to which respective BACs belong. Members of the configuration family generally use the same memory, chassis, processor, or the like. As an example, FIGS. 3A and 3B shows that BACs 302A and 302B both pertain to an 8826 Man-O-War product family, whereas BACs 302C and 302D pertain to an 0570 L4 Rack series product family.

Column (d) of FIGS. 3A and 3B shows the content that each BAC is required to have, in order to be considered for reconfiguration and use in filling the product order. Thus, BAC 302A must have components FC1, FC2 and FC3 to be considered, where FC refers to a feature code that identifies a particular computer part, or other component or item. Because BACs are different from one another, the content that is required for different BACs likewise can be different.

To illustrate flexibility, column (e) indicates that content items can be described in the templates using either sales or manufacturing related nomenclature. Sales nomenclature would be the type of description used in the customer order or the like to identify items or components. Manufacturing nomenclature would use the terminology of the BOM (Bill of Material).

Column (e) of FIGS. 3A and 3B further shows that for the match level Sales Items the location of content items is null, whereas for the Manufacturing Bills match level the content location can be shown by various codes. At column (f), a "List of sales items to be configured" is a list of the entire contents of the corresponding BAC, including all parts and items. Column (g) sets forth a match percentage, which is pre-calculated by the algorithm for each BAC, based on its particular construction or configuration. The purpose of the match percentages of column (g) is described hereinafter in further detail.

Referring further to FIGS. 3A and 3B, there is shown a two part procedure for analyzing or comparing respective BACs 302A-D with the specifications required for the configuration of the current customer product order. At step 304, the product order configuration is compared with the contents of a BAC, to determine whether the BAC contains all contents required by the order. Accordingly, the BOM structure and manufacturing instructions of the customer product configuration order are provided at step 304. The content required to enable respective BACs to be considered for reconfiguration as the ordered product, as described above, is also needed at step 304. As indicated by item 306 of FIGS. 3A and 3B, the required content can be in the form of sales items, manufacturing items, and placement and quantity of respective items.

If it is determined at step 304 that all content required for a particular BAC is not available or present therein, decision block 308 generates a negative output, to indicate that the particular BAC cannot match the customer order configuration. However, if the output of decision block 308 is positive, indicating that the particular BAC does include all required content, the match algorithm proceeds to step 310.

At step 310, each specification of the product order, for all required parts and components, is compared with all parts and components of the particular BAC, as shown by the configuration detail (f) for the particular BAC. The result of the comparison is a percentage value that indicates the extent to which parts required for the ordered product match respective parts that are already built into the particular BAC. Matching can extend to the location and quantity of such parts. For example, the percentage could represent the number of matches actually found, as a percentage of all parts or components of the product order that were searched for in regard to the particular BAC.

At step 312 of FIGS. 3A and 3B, the match algorithm compares the percentage match computed at step 310 for a particular BAC with the match percentage in column (g) of the template for the particular BAC. If the computed percentage is less than the percentage required at column (g) for such BAC, the particular BAC does not sufficiently match the product configuration. However, if the percentage is at least equal to the match percentage of column (g), the particular BAC will be considered for reconfiguration, to completely match the product order configuration. The actual match percentage for the particular BAC, as computed at step 310, will be used in ranking the particular BAC on the list provided by function 216 of FIG. 2.

Referring to FIG. 4 there is shown the user 104 adding to, changing, or deleting BAC templates that were previously created in association with function block 102. Such template modifications are periodically required, due to events such as market shifts, new product offerings by the source provider, or sales skews. When one of these events occurs, it is necessary to determine whether the event changes a previously existing template, or adds a new template, as indicated by the decision block 402. If a new template is being added, function block 404 requires analysis and readjustment of all configurations previously stored in the history database associated with function block 208 of FIG. 2. This is achieved by running the best match algorithm, described above, for the new template on all configurations stored in the historical database. Results of this procedure are then stored in the historical database.

If decision block 402 generates a negative output, indicating change or deletion of a previously existing template, function block 406 requires the automatic elimination of all past recommendations for this template, since the definition is no longer the same. This process deletes all references to the template by its identification number, across all historical configurations. The results of this process are also then stored in the database associated with function block 208.

The above actions are intended to automatically fix and adjust historical recommendations in order to allow template simulation, changes, and new creations.

Figure 5:
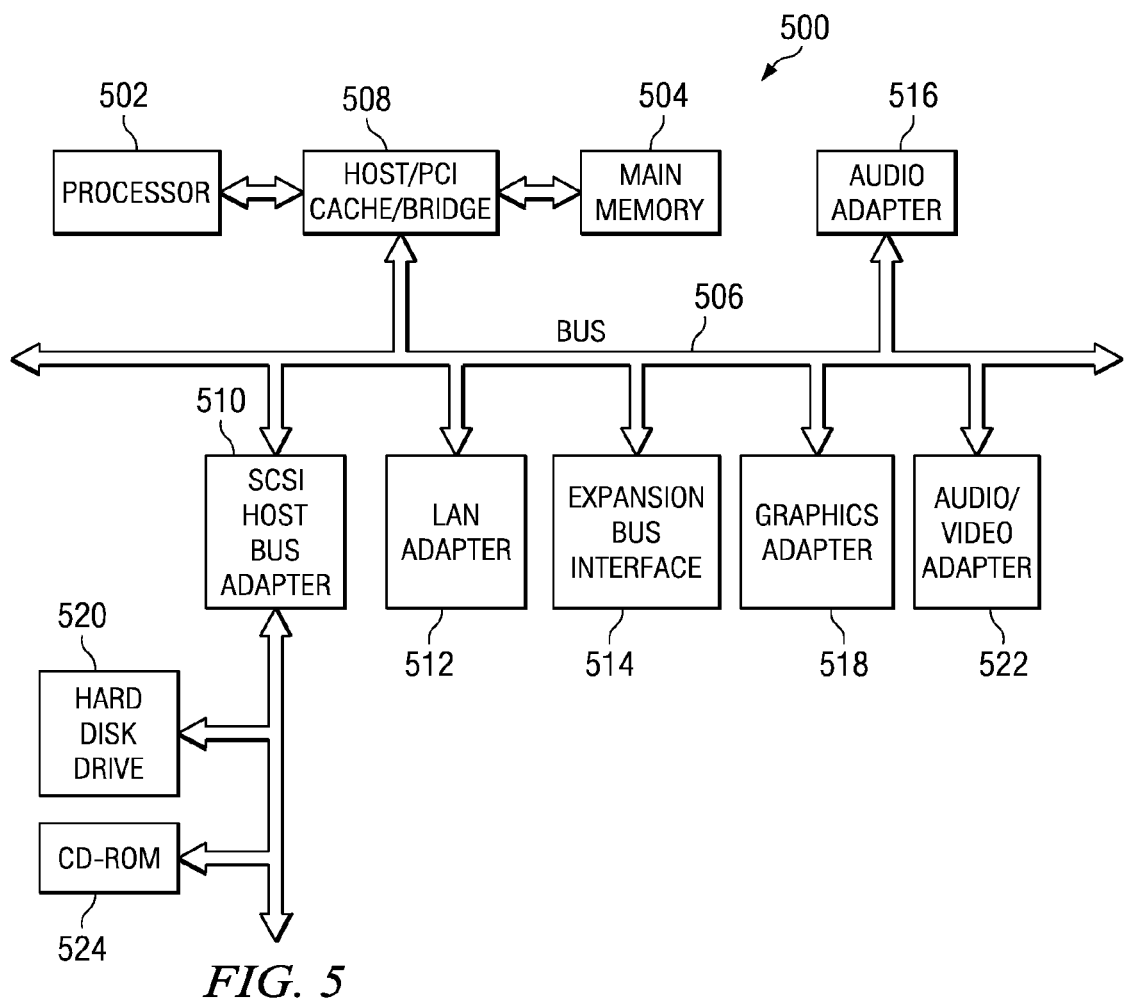
FIG. 5 is a block diagram showing a computer or data processing system that may be used in implementing embodiments of the invention.

Referring to FIG. 5, there is shown a block diagram of a generalized data processing system 500 which may be used in implementing embodiments of the present invention, including steps and procedures described in connection with FIGS. 2A and 2B, 3A and 3B, and 4. Data processing system 500 exemplifies a computer, in which code or instructions for implementing the processes of the present invention may be located. Data processing system 500 usefully employs a peripheral component interconnect (PCI) local bus architecture, although other bus architectures such as Accelerated Graphics Port (AGP) and Industry Standard Architecture (ISA) may alternatively be used. FIG. 5 shows a processor 502 and main memory 504 connected to a PCI local bus 506 through a Host/PCI bridge 508. PCI bridge 508 also may include an integrated memory controller and cache memory for processor 502.

Referring further to FIG. 5, there is shown a local area network (LAN) adapter 512, a small computer system interface (SCSI) host bus adapter 510, and an expansion bus interface 514 respectively connected to PCI local bus 506 by direct component connection. Audio adapter 516, a graphics adapter 518, and audio/video adapter 522 are connected to PCI local bus 506 by means of add-in boards inserted into expansion slots. SCSI host bus adapter 510 provides a connection for hard disk drive 520, and also for CD-ROM drive 524.

An operating system runs on processor 502 and is used to coordinate and provide control of various components within data processing system 500 shown in FIG. 5. The operating system may be a commercially available operating system such as Windows XP, which is available from Microsoft Corporation. Instructions for the operating system and for applications or programs are located on storage devices, such as hard disk drive 520, and may be loaded into main memory 504 for execution by processor 502.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for increasing efficiency in constructing individual products of a particular product type, wherein each individual product has an associated specification set, said method comprising the steps of:

constructing a plurality of build ahead configurations (BACs), wherein each constructed BAC comprises an incomplete individual product of said particular type, and has an associated BAC specification set, and at least one of said constructed BACs is different from another of said constructed BACs;

receiving, an order for an individual product of said particular product type, at a time after said BACs have been constructed, wherein the order has an ordered product specification set that defines each specification in the specification set for said ordered individual product;

calculating, by a computer, a metric for each constructed BAC, wherein the metric for a given constructed BAC represents the amount of effort required to modify the given constructed BAC so that the modified BAC will conform to all of the specifications in the ordered product specification set of said ordered individual product;

calculating, by the computer, said metric for the given constructed BAC by comparing respective specifications in the ordered product specification set with the specifications in the BAC specification set of the given constructed BAC; and using said calculated metrics to select one of said constructed BACs for modification, in order to provide said ordered individual product.

2. The method of claim 1, wherein:

modification of at least one of said BACs requires the removal of one or more parts therefrom, in order to conform to all of the specifications in the ordered product specification set of said ordered individual product.

3. The method of claim 1, wherein:

content in the specification set of each of said BACs, as well as content in the specification set of said ordered individual product, each includes a list of parts.

4. The method of claim 3, wherein:

the parts list for a BAC is contained in a template corresponding to the BAC, and said comparing step comprises searching the parts list of each template in order to detect matches with the parts in the parts list of said ordered individual product.

5. The method of claim 4, wherein:

said comparing step provides a percentage value for a given BAC representing the extent to which the listed parts of said given BAC match the listed parts of said ordered individual product.

6. The method of claim 5, wherein:

said method includes enabling only BACs with percentage values that are equal to or greater than a prespecified threshold value to be considered for modification to provide said ordered individual product.

7. The method of claim 1, wherein:
said comparing step includes determining whether a particular BAC includes all prespecified part content that the particular BAC must have to be considered for modification to provide said ordered individual product.

8. The method of claim 1, wherein:
said comparing step is implemented using a match algorithm.

9. The method of claim 4, wherein:
said templates are stored in a historical information database and disposed to be updated periodically.

10. The method of claim 1, wherein:
said BACs are ranked in numerical order according to the values of their respective metrics, and said numerical ranking of said BAC's is made available to a manufacturer of said ordered individual product, for use in selecting a BAC for modification to provide said ordered individual product.

11. A computer program product in a computer readable medium for increasing efficiency in constructing individual products of a particular product type, wherein each individual product has an associated specification set, said computer program product comprising:
first executable instructions for constructing a plurality of build ahead configurations (BACs), wherein each constructed BAC comprises an incomplete individual product of said particular type, and has an associated BAC specification set, and at least one of said constructed BACs is different from another of said constructed BACs;
second executable instructions for receiving an order for an individual product of said particular product type, at a time after said BACs have been constructed, wherein the order has an ordered product specification set that defines each specification in the specification set for said ordered individual product;
third executable instructions for calculating a metric for each constructed BAC, wherein the metric for a given constructed BAC represents the amount of effort required to modify the given constructed BAC so that the modified BAC will conform to all of the specifications in the ordered product specification set of said ordered individual product;
fourth executable instructions for calculating said metric for the given constructed BAC by comparing respective specifications in the ordered product specification set with the specifications in the BAC specification set of the given constructed BAC; and
fifth executable instructions for using said calculated metrics to select one of said constructed BACs for modification, in order to provide said ordered individual product.

12. The computer program product of claim 11, wherein:
modification of at least one of said BACs requires the removal of one or more parts therefrom, in order to conform to all of the specifications in the ordered product specification set of said ordered individual product.

13. The computer program product of claim 11, wherein:
content in the specification set of each of said BACs, as well as content in the specification set of said ordered individual product, each includes a list of parts wherein the parts list for a BAC is contained in a template corresponding to the BAC, and the parts list of each template is searched in order to detect matches with the parts in the parts list of said ordered individual product.

14. The computer program product of claim 13, wherein:
a percentage value is provided for a given BAC that represents the extent to which the listed parts of said given BAC match the listed parts of said ordered individual product.

15. The computer program product of claim 14, wherein:
only BACs with percentage values that are equal to or greater than a prespecified threshold value are allowed to be considered for modification to provide said ordered individual product.

16. The computer program product of claim 11, wherein:
fourth instructions are provided to determine whether a particular BAC includes all prespecified part content that the particular BAC must have to be considered for modification to provide said ordered individual product.

17. The computer program product of claim 11, wherein:
a matching algorithm is implemented to compare said specification of said ordered individual product with specifications of each of said BACs.

18. An apparatus for increasing efficiency in constructing individual products of a particular product type, wherein each individual product has an associated specification set, said apparatus comprising:
a computer having:
a first device for providing templates for use in constructing a plurality of build ahead configurations (BACs), wherein each constructed BAC comprises an incomplete individual product of said particular type, and has an associated BAC specification set, and at least one of said constructed BACs is different from another of said constructed BACs;
a second device for receiving an order for an individual product of said particular product type, at a time after said BACs have been constructed, wherein the order has an ordered product specification set that defines each specification in the specification set for said ordered individual product;
a third device for calculating a metric for each constructed BAC, wherein the metric for a given constructed BAC represents the amount of effort required to modify the given constructed BAC so that the modified BAC will conform to all of the specifications in the ordered product specification set of said ordered individual product;
a fourth device for calculating said metric for the given constructed BAC by comparing respective specifications in the ordered product specification set with the specifications in the BAC specification set of the given constructed BAC; and
a fifth device for using said calculated metrics to select one of said constructed BACs for modification, in order to provide said ordered individual product.

19. The apparatus of claim 18, wherein:
content in the specification set of each of said BACs, as well as content in the specification set of said ordered individual product, each includes a list of parts wherein the parts list for a BAC is contained in a template corresponding to the BAC, and the parts list of each template is searched in order to detect matches with the parts in the parts list of said ordered individual product.

20. The apparatus of claim 19, wherein:
a percentage value is provided for a given BAC that represents the extent to which the listed parts of said given BAC match the listed parts of said ordered individual product.

* * * * *